United States Patent
Daniels (10) Patent No.: US 7,618,310 B2
(45) Date of Patent: Nov. 17, 2009

(54) APPARATUS AND METHODS FOR VENTILATION OF SOLAR ROOF PANELS

(76) Inventor: Gregory S. Daniels, 2413 Hidden Valley Dr., Santa Rosa, CA (US) 95404

(*) Notice: Subject to any disclaimer, the term of this patent is extended or adjusted under 35 U.S.C. 154(b) by 293 days.

(21) Appl. No.: 11/682,226

(22) Filed: Mar. 5, 2007

(65) Prior Publication Data

US 2007/0207725 A1    Sep. 6, 2007

Related U.S. Application Data

(60) Provisional application No. 60/780,014, filed on Mar. 6, 2006.

(51) Int. Cl.
*F24F 7/02* (2006.01)
*E04D 13/18* (2006.01)
*E04B 7/00* (2006.01)

(52) U.S. Cl. ............... 454/366; 454/367; 454/900; 52/173.3; 52/198; 52/199

(58) Field of Classification Search ............... 454/365, 454/366, 367, 368, 900, 250; 52/173.3, 198, 52/199
See application file for complete search history.

(56) References Cited

U.S. PATENT DOCUMENTS

| | | | |
|---|---|---|---|
| 4,432,273 A | | 2/1984 | Devitt |
| 4,677,903 A | * | 7/1987 | Mathews, III ............... 454/185 |
| 5,121,583 A | * | 6/1992 | Hirai et al. ............... 52/90.1 |
| 5,131,888 A | | 7/1992 | Adkins, II |
| 5,722,887 A | | 3/1998 | Wolfson et al. |
| 6,050,039 A | * | 4/2000 | O'Hagin ............... 52/302.1 |
| 6,061,978 A | * | 5/2000 | Dinwoodie et al. ............... 52/173.3 |
| 6,105,317 A | * | 8/2000 | Tomiuchi et al. ............... 52/173.3 |
| 6,447,390 B1 | * | 9/2002 | O'Hagin ............... 454/250 |
| 6,491,579 B1 | | 12/2002 | O'Hagin |
| 2003/0000158 A1 | * | 1/2003 | Borges ............... 52/200 |
| 2004/0098932 A1 | * | 5/2004 | Broatch ............... 52/173.1 |
| 2005/0239394 A1 | | 10/2005 | O'Hagin et al. |
| 2007/0072541 A1 | | 3/2007 | Daniels, II et al. |

FOREIGN PATENT DOCUMENTS

| | | | |
|---|---|---|---|
| DE | 2804301 A | * | 8/1979 |
| GB | 2 279 453 A | | 1/1995 |
| GB | 2 345 536 A | | 7/2000 |
| JP | 06-272920 | | 9/1994 |
| JP | 11044035 A | * | 2/1999 |
| JP | 11229576 A | * | 8/1999 |
| JP | 2000274032 A | * | 10/2000 |

* cited by examiner

*Primary Examiner*—Patrick F. O'Reilly, III
(74) *Attorney, Agent, or Firm*—Knobbe Martens Olson & Bear LLP (57) ABSTRACT

A roof portion including solar roof panels and field vents is disclosed. The roof portion includes a sloped roof deck and a cover layer spaced above the roof deck to form a gap between the roof deck and the cover layer. The cover layer includes a layer of cover elements, and a field of one or more solar panels generally within the layer of cover elements. The cover layer also includes a first plurality of field vents positioned within the cover layer substantially immediately below the solar panel field. The cover layer further includes a second plurality of field vents positioned within the cover layer substantially immediately above the solar panel field. The field vents permit airflow between the gap and the atmosphere above the roof.

48 Claims, 7 Drawing Sheets

APPARATUS AND METHODS FOR VENTILATION OF SOLAR ROOF PANELS

CLAIM FOR PRIORITY

This application claims the priority benefit under 35 U.S.C. § 119(e) of Provisional Application Ser. No. 60/780,014, filed Mar. 6, 2006. The full disclosure of this priority application is incorporated herein by reference.

BACKGROUND OF THE INVENTION

1. Field of the Invention

This application relates generally to roof ventilation systems, and specifically to ventilation systems for roofs employing solar panels.

2. Description of the Related Art

A roof of a building typically includes roof vents that ventilate the region directly underneath the roof, which is ordinarily the building's attic space. Ventilation of the attic is important in keeping the building temperature from rising to undesirable levels. A variety of different types of roof vents exist, such as field vents, eave vents, ridge vents, soffit or undereave vents, and the like. Of particular interest for the present application is a field vent, which is a vent positioned within the "field" of a roof, and which allows airflow through the roof field between regions above and below the roof.

Figure 1:
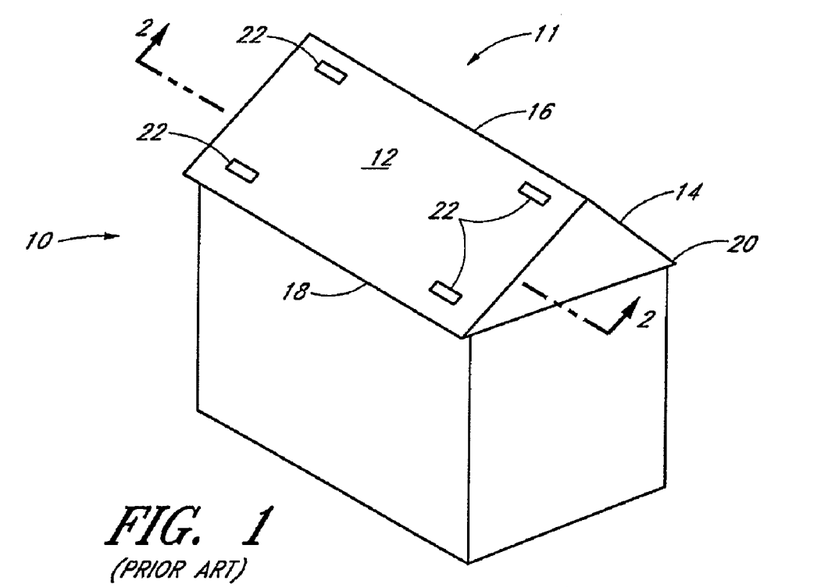
FIG. 1 is a perspective view of a building with a conventional roof and conventional field vents in the roof.

For example, FIG. 1 shows a building 10 with a typical roof 11 comprising two fields 12 and 14 joined together at an upper ridge 16, the lower ends of the fields defining eaves 18 and 20. While FIG. 1 illustrates a very simple roof structure with only one linear ridge and only two roof fields, many buildings have more than two field portions and multiple linear ridge sections. The illustrated roof 11 includes a plurality of field vents 22, which allow airflow between the building's attic and the exterior atmosphere. Many different types of field vents 22 exist. Typically, field vents 22 are designed to permit airflow while preventing the ingress of snow, water, vermin, and debris into the building 10. Accordingly, field vents 22 may include screens or other types of filters, as well as baffles to prevent the ingress of wind-driven rain through the vent.

Figure 2:
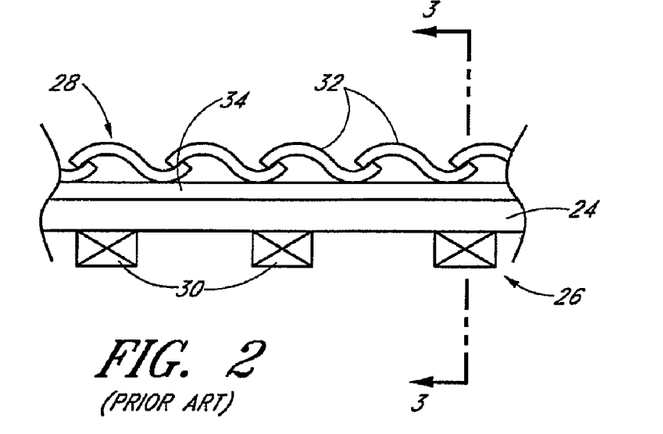
FIG. 2 is a cross-sectional view taken along line 2-2 of FIG. 1.
Figure 3:
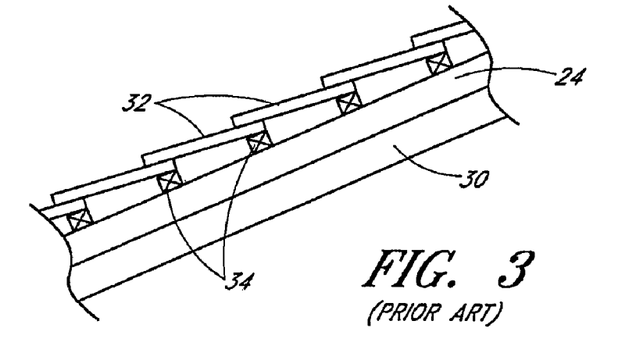
FIG. 3 is a cross-sectional view taken along line 3-3 of FIG. 2.

FIG. 2 shows a cross-sectional view of the roof 11. The roof 11 typically comprises a roof deck 24 secured over a frame structure 26, and a covering structure 28 overlaying the roof deck 24. The frame structure 26 normally comprises a plurality of rafters 30 (e.g., wooden beams) extending generally from the ridge 16 to the eaves 18 and 20. The roof deck 24 typically comprises a structural layer formed over the frame structure 26, such as plywood sheeting nailed onto the rafters 30. The covering structure 28 is provided as a shield against the elements, including solar radiation, rain, snow, and the like. Common covering structures include concrete and clay tiles, shingles, and so-called "composition roof sheets," which are normally a composite of tar paper, recycled asphalt, and other materials provided on a felt underlay. In FIG. 2, the roof 11 comprises a tile roof. While the illustrated covering structure 28 comprises so-called "S-shape" tiles 32, many different shapes and sizes of tiles are employed in tile roofs. The tiles 32 typically rest upon battens 34 interposed between the tiles and the roof deck 24, the battens 34 oriented parallel to the ridge 16 and eaves 18 and 20. FIG. 3 shows a cross-sectional view of the roof 11 depicted in FIG. 2. In FIG. 3, the tiles 32 are illustrated as flat tiles instead of as S-shaped tiles.

Referring again to FIG. 1, some field vents 22 are designed to mimic the appearance of the roof 11, so that the vents blend in visually. For example, if the roof 11 comprises a tile roof, the field vents 22 can be designed to mimic the shape and color of the tiles. Exemplary vents are sold by O'Hagin's, Inc. of Sebastopol, Calif. Such vents typically include a subflashing member (also referred to as a primary vent member) that resides within an opening in the roof deck, and a secondary vent member positioned above the subflashing member. The subflashing member includes an opening that communicates with the opening in the roof deck. The secondary vent member is shaped like one of the tiles of the tile roof, and covers the openings in the subflashing member and the roof deck so as to prevent the ingress of snow, rain, etc. The secondary vent member typically includes one or more other openings to provide a path for airflow through the vent. In most field vents of this variety, there is no direct line of sight through the openings in the secondary vent member and the subflashing member. Typically, the vent members include louvers, screened openings, or other types of openings combined with baffles, spacers, diverters, or a combination thereof to prevent the ingress of water, wind-driven rain, vermin, and debris into the building while still permitting airflow through the openings of the subflashing member and the secondary vent member. Examples of such types of field vents are illustrated and described in U.S. Pat. Nos. 6,447,390 and 6,050,039, the full disclosures of which are hereby incorporated herein by reference.

Due to increasing energy costs, the use of solar panels provided on building roofs has increased in recent years. In one type of installation, a field of solar panels is provided on top of the covering structure 28 (e.g., on top of the roof's layer of shingles, tiles, composition shingles, steel sheets, or other roofing materials). In another installation, the solar panels form a portion of the covering structure 28, effectively replacing sections of shingles, tiles, or other roofing materials. In either case, the field of solar panels is typically supported by a grid structure provided on the roof. The solar panels convert solar radiation into electricity. The solar panels are normally wired through the roof to transmit this electricity to (1) one or more batteries associated with the building, (2) a community power grid (for which power customers can sometimes obtain discounts on their power bills), and/or (3) devices requiring electricity for operation.

SUMMARY OF THE INVENTION

A solar panel typically comprises semiconductor layers that react to photon inputs by generating a flow of electrons. Such devices are often designed to operate within an optimum temperature envelope. If the temperature is too high, or if the solar panels become too hot, their performance and efficiency can decline. The presently disclosed embodiments seek to overcome this problem by providing for ventilation airflow in and around the installed solar panels, and of the space between the solar panels and the portion of the roof below the solar panels, thus improving the efficiency of said panels in certain temperature conditions. In some aspects of the invention, radiant barriers are also provided to reduce the temperature inside the attic. In further aspects, fans are also provided in order to assist the ventilation.

In one aspect, a roof portion is provided, comprising a sloped roof deck, a cover layer spaced above the roof deck to form a gap between the roof deck and the cover layer, and first and second pluralities of field vents. The cover layer comprises a plurality of cover elements arranged generally in a plane, and a field of one or more solar panels generally within the plane. The first plurality of field vents is positioned within the cover layer substantially immediately below the solar panel field. The second plurality of field vents is positioned within the cover layer substantially immediately above the solar panel field. The field vents permit airflow between the gap and the atmosphere above the roof.

In another aspect, a method is provided. In accordance with the method, a cover layer is provided, the cover layer being spaced above a sloped roof deck of a roof to form a gap between the roof deck and the cover layer. The cover layer comprises a plurality of cover elements arranged generally in a plane, and a field of one or more solar panels generally within the plane. A first plurality of field vents is provided within the cover layer substantially immediately below the solar panel field. A second plurality of field vents is provided within the cover layer substantially immediately above the solar panel field. The field vents permit airflow between the gap and the atmosphere above the roof.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Figure 4:
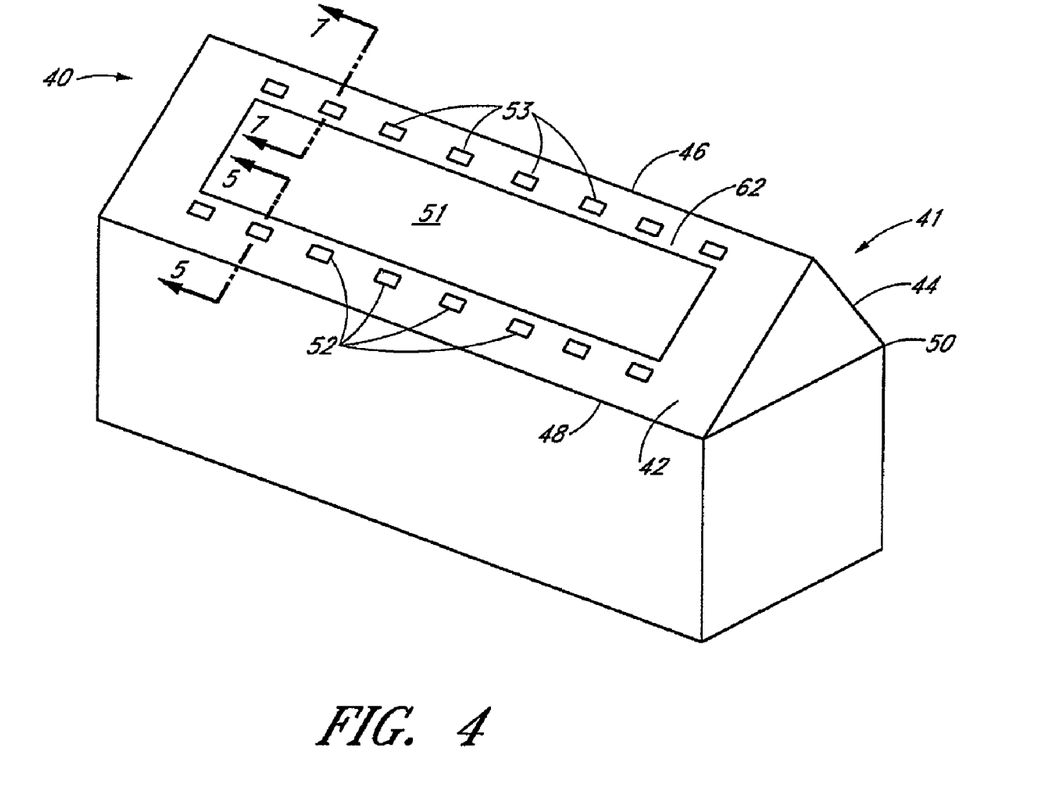
FIG. 4 is a perspective view of a building having a roof with solar panels and field vents, in accordance with one embodiment of the present invention.

FIG. 4 is a perspective view of a building 40 having a roof 41 in accordance with one embodiment of the present invention. The roof 41 includes roof fields or portions 42 and 44, a ridge 46, and eaves 48 and 50. A field of solar panels 51 is provided within the roof portion 42. While not shown, an additional field of solar panels 51 can be provided within the roof portion 44. The solar panel field 51 can comprise a plurality of solar panels, or alternatively only one larger panel. It will also be understood that multiple contiguous fields of solar panels could be provided within each roof portion 42 and 44, instead of just one contiguous field 51 as shown. As used herein, a solar panel "field" refers to an arrangement of one or more solar panels along a planar or possibly curved surface. Preferably, the one or more solar panels substantially mimic the appearance of the remainder of the roof portion 42.

The illustrated roof 41 includes a first plurality of roof field vents 52 positioned substantially immediately below the solar panel field 51, and a second plurality of roof field vents 53 positioned substantially immediately above the solar panel field 51. As used herein, "substantially immediately" means that the roof field vents 52 are substantially closer to the solar panel field 51 than to the eave 48, and that the roof field vents 53 are substantially closer to the solar panel field 51 than to the ridge 46. In the illustrated embodiment, each plurality of field vents 52, 53 is arranged substantially linearly and substantially parallel to the ridge 46. It will be understood that alternative orientations and arrangements of the solar panel field 51 and the field vents 52 and 53 are possible.

Figure 5A:
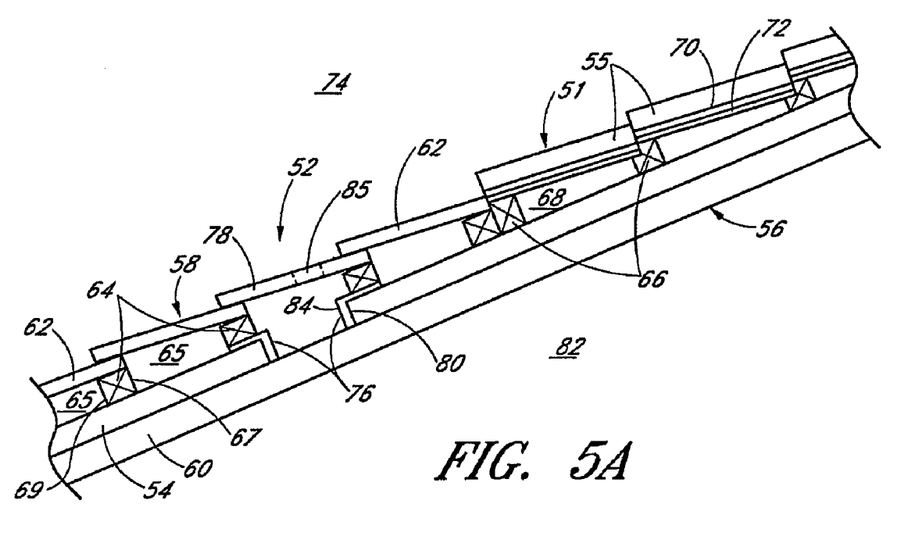
FIG. 5A is a cross-sectional view taken along line 5-5 of FIG. 4.

FIG. 5A shows a cross-sectional view of a portion of the roof 41. Referring to FIGS. 4 and 5A, the illustrated roof 41 includes a sloped frame structure 56 comprising a plurality of rafters 60 extending from the ridge 46 to the eaves 48 and 50. A sloped roof deck 54 is supported on the rafters 60, the roof deck 54 comprising, for example, plywood sheeting. A covering layer or structure 58 is spaced above the roof deck 54 to form a gap region 65, 68 between the roof deck 54 and the cover layer 58. The illustrated cover layer 58 comprises a plurality of cover elements 62 arranged generally in a plane or as a layer, and a field 51 of one or more solar panels positioned within the plane or layer. In the illustrated embodiment, the cover elements 62 comprise tiles, such as clay or concrete tiles. While the tiles 62 are illustrated as flat tiles, tiles of other shapes and sizes can alternatively be employed, such as S-type or M-type tiles. While the illustrated covering layer or structure 58 comprises a layer of tiles 62, it could alternatively comprise shingles or other types of cover elements.

In the illustrated embodiment, the tiles 62 are supported on battens 64, preferably in a manner known in the art. The illustrated battens 64 extend substantially parallel to the ridge 46 and the eaves 48 and 50. In this arrangement, the battens 64 define a "batten cavity" 65 between the roof deck 54 and the tiles 62. Each batten 64 preferably has openings to permit airflow therethrough between the batten's ridge-facing side 67 and eave-facing side 69. The battens' openings can be screened or otherwise filtered to prevent the flow of insects, vermin, debris, and the like through the battens 64.

Referring still to FIG. 5A, the field 51 of one or more solar panels 55 can be supported on a grid structure comprising a plurality of interconnected beams 66 that in turn rest upon the roof deck 54. The grid structure can include beams (not shown) that are oriented substantially parallel to the rafters 60, as well as beams 66 (some of which are shown) oriented substantially parallel to the battens 64. The grid structure defines a gap 68 between the roof deck 54 and the solar panel field 51. Preferably, the beams 66 have openings to allow airflow across the beams 66 within the gap 68. Such openings in the beams 66 can be screened or otherwise filtered to prevent the flow of insects, vermin, debris, and the like through the beams 66. The gap region 68 is preferably in fluid communication with the batten cavity 65. Although not shown, the solar panel field 51 is preferably electrically wired to one or more batteries, for collection of solar power in the form of electricity.

In the illustrated embodiment, the solar panels 55 substantially mimic the appearance of the cover elements 62. As such, the solar panels 55 are preferably arranged in rows extending substantially parallel to the ridge 46 of the roof 41. Also, each row of solar panels 55 is vertically displaced from adjacent rows. A variety of different types of beam 66 configurations are possible. In the illustrated embodiment, certain of the beams 66 are configured to support both an upslope solar panel 55 and a downslope solar panel 55.

A radiant barrier layer 72 is preferably provided below the solar panel field 51 and above the roof deck 54. In the illustrated embodiment, each solar panel 55 includes a separate radiant barrier layer 72. The radiant barrier layer 72 is preferably spaced below the solar panel field 51 (e.g., the separate radiant barrier layer 72 for each solar panel 55 can be spaced below the solar panel 55), and is also preferably spaced above the roof deck 54. One example of a suitable radiant barrier layer 72 is aluminum foil. A spacer layer 70 is preferably interposed between the solar panel field 51 and the radiant barrier layer 72, to reduce heat flow to the solar panel field from below. In the illustrated embodiment, the underside of each solar panel 55 includes a separate spacer layer 70 and radiant barrier layer 72. Thus, in the illustrated embodiment, the solar panel field 51 comprises a plurality of solar panels 55, the spacer layer 70 comprises a plurality of spacer layer portions each underneath one of the solar panels 55, and the radiant barrier layer 72 comprises a plurality of radiant barrier layer portions each underneath one of the spacer layer portions. As used herein, the term "radiant barrier layer" may comprise one contiguous radiant barrier layer or a plurality of separate radiant barrier layer portions as shown. The term "spacer layer" may comprise one contiguous spacer layer or a plurality of separate spacer layer portions as shown. The spacer layer 70 preferably includes one or more air pockets, in order to reduce heat conduction through the layer 70. In one embodiment, the spacer layer 70 comprises bubble wrap or a material with similar insulative properties. Suitable radiant barrier and spacer layers are sold by Innovative Insulation, Inc. of Arlington, Tex.

In some embodiments, the radiant barrier layer 72 (or the separate layers 72 of the plurality of solar panels 55) have upper and lower surfaces with different reflectivities. For example, the top surface of the radiant barrier layer 72 can be less reflective of radiant heat than the bottom surface thereof, or vice-versa. Also, the radiant barrier layer 72 is preferably a poor heat conductor (e.g., aluminum foil), such that it does not conduct much heat to the solar panel field 51. Also, the radiant barrier layer 72 preferably has a low emissivity (the tendency of a material to radiate heat), so that it does not radiantly heat the solar panel field 51 to an undesirable extent. The radiant barrier layer 72 can optionally be used in conjunction with another radiant barrier layer associated with the roof deck 54, to provide further resistance to the flow of radiant heat.

With continued reference to FIGS. 4 and 5A, each field vent 52, 53 preferably permits airflow between the gap regions 65 and 68 and the atmosphere 74 above the roof 41. The field vents 52, 53 preferably mimic an appearance of the cover elements 62. For example, the field vents 52, 53 can mimic the appearance of tiles or shingles.

FIG. 5A shows a configuration of a field vent 52 in accordance with one embodiment. Skilled artisans will understand that the field vents 53 can be similarly configured. In the illustrated embodiment, at least some of the field vents 52 comprise a primary vent member 76 and a secondary vent member 78. The primary vent member 76 is preferably secured to the roof deck 54 at an opening 80 in the roof deck. The primary vent member 76 permits airflow through the opening 80 between the gap region (defined by the batten cavity 65 and the gap 68) and a region 82 below the roof deck 54. In a typical building, the region 82 comprises an attic space. The primary vent member 76 will typically include one or more openings 84 to allow for airflow therethrough.

The secondary vent member 78 is preferably positioned above the primary vent member 76, to permit airflow between the gap region 65, 68 and the atmosphere 74 above the roof 41. Accordingly, the secondary vent member 78 preferably includes one or more openings 85 (indicated schematically by dotted lines) to permit such airflow. The openings 84 and 85 are preferably configured as louvers, screened openings, or other types of openings. The vent members 76 and 78 preferably include baffles, spacers, diverters, or a preferably optimum combination thereof to prevent any direct line of sight through the openings 84 and 85 and to prevent the ingress of water, wind-driven rain, vermin, and debris through the openings 84 and 85 to the region 82 below the roof deck 54, while still permitting airflow from the region 82 to the gap region 65, 68 and to the atmosphere 74. The secondary vent members 78 of the field vents 52 preferably mimic an appearance of the cover elements 62. For example, the secondary vent members 78 may mimic the appearance of tiles or shingles.

Figure 6A:
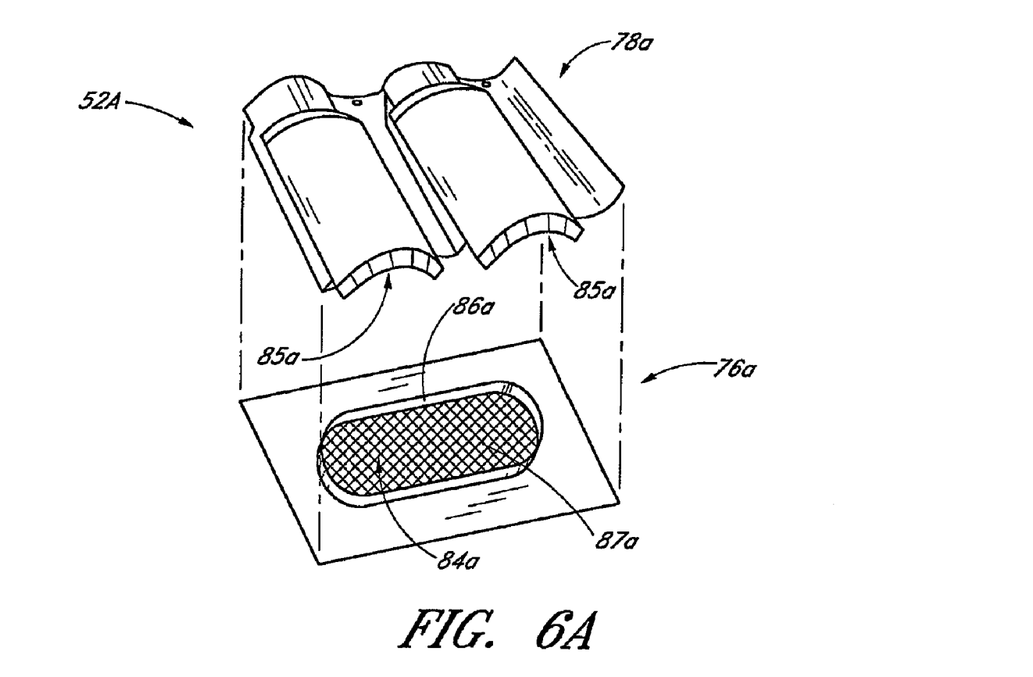
FIG. 6A is a perspective view of a field vent that mimics the appearance of S-shaped tiles, in accordance with one embodiment of the present invention.
Figure 6B:
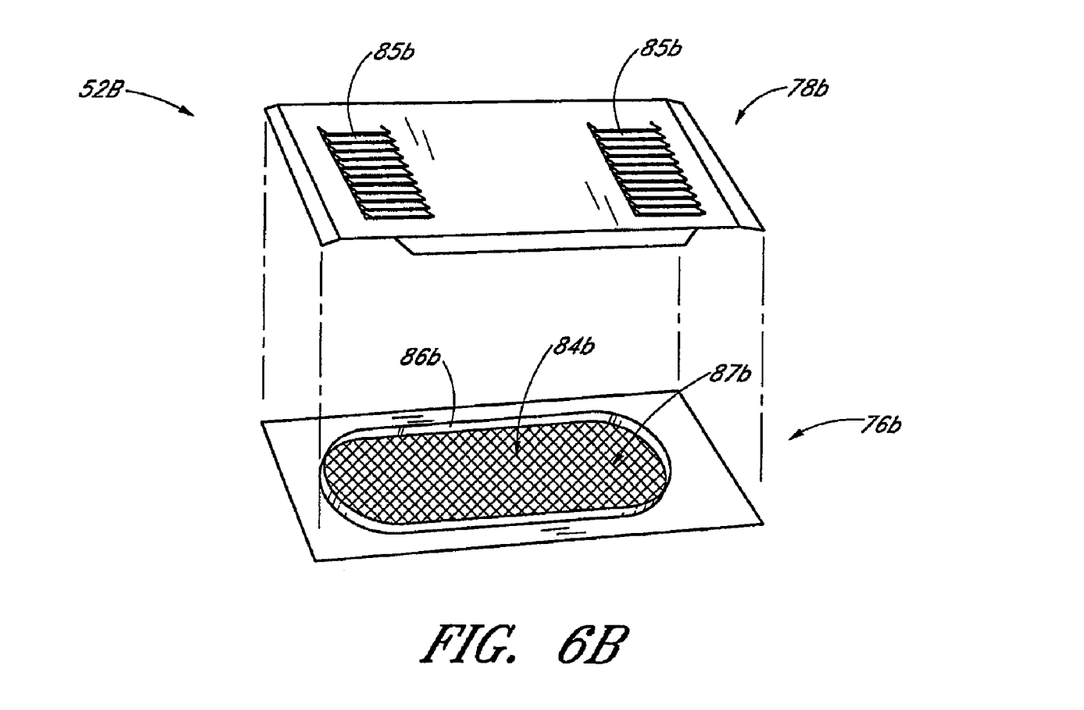
FIG. 6B is a perspective view of a field vent that mimics the appearance of flat tiles, in accordance with another embodiment of the present invention.

FIGS. 6A and 6B are perspective views of embodiments of field vents. FIG. 6A illustrates a field vent 52A which mimics the appearance of S-shaped tiles while FIG. 6B illustrates a field vent 52B which mimics the appearance of flat tiles. Each of the field vents 52A and 52B comprises a primary vent member 76a, 76b and a secondary vent member 78a, 78b.

Each of the primary vent members 76a, 76b includes an opening 84a, 84b to permit airflow between regions above and below the primary vent member 76a, 76b. Each of the primary members 76a, 76b may also include upstanding baffles 86a, 86b that prevent ingress of water into the opening 84a, 84b. The illustrated opening 84a, 84b is covered by a screen 87a, 87b to prevent entry of insects, vermin, and debris larger than the screen openings.

The secondary vent member 78a of the field vent 52A is shaped to resemble the appearance of S-type tiles. The secondary vent member 78a includes openings 85a to permit airflow between regions above and below the secondary vent member 78a while preventing the ingress of water and wind-driven rain.

The secondary vent member 78b of the field vent 52B is shaped to resemble the appearance of flat tiles. The secondary vent member 78b includes openings 85b to permit airflow between regions above and below the secondary vent member 78b while preventing the ingress of water and wind-driven rain. The illustrated openings 85b are configured as louvers. In certain embodiments, the field vent 52B may be used in a shingled roof. Skilled artisans will understand that the field vents can have various other shapes and configurations.

Figure 7A:
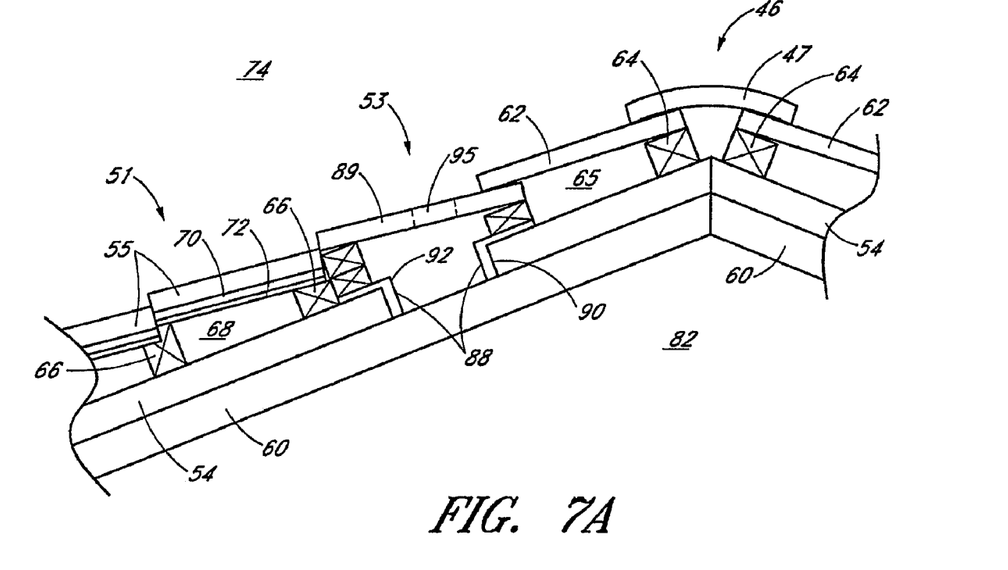
FIG. 7A is a cross-sectional view taken along line 7-7 of FIG. 4.

FIG. 7A shows a cross-sectional view of an upper portion of the roof 41. The illustrated field vent 53 comprises a primary vent member 88 and a secondary vent member 89. The primary vent member 88 is preferably secured to the roof deck 54 at an opening 90 in the roof deck 54. The primary vent member 88 permits airflow through the opening 90 between the gap region (defined by the batten cavity 65 and the gap 68) and the region 82 (e.g., attic space) below the roof deck 54. The primary vent member 88 will typically include one or more openings 92 to allow for airflow therethrough.

The secondary vent member 89 is preferably positioned above the primary vent member 88, to permit airflow between the gap region 65, 68 and the atmosphere 74 above the roof 41. Accordingly, the secondary vent member 89 preferably includes one or more openings 95 (indicated schematically by dotted lines) to permit such airflow. The openings 92 and 95 are preferably configured as louvers, screened openings, or other types of openings. The vent members 88 and 89 preferably include baffles, spacers, diverters, or a preferably optimum combination thereof to prevent any direct line of sight through the openings 92 and 95 and to prevent the ingress of water, wind-driven rain, vermin, and debris through the openings 92 and 95 to the region 82 below the roof deck 54, while still permitting airflow from the region 82 to the gap region 65, 68 and to the atmosphere 74. The secondary vent members 89 of the field vents 53 preferably mimic an appearance of the cover elements 62. For example, the secondary vent members 89 may mimic the appearance of tiles or shingles.

With continued reference to FIG. 7A, the ridge 46 may be covered by a ridge cap 47, as known in the art. Alternatively, a ridgeline vent can be provided at the ridge 46, also as known in the art. A ridgeline vent provides for ventilation directly at and along the ridge 46. Ridgeline vents are well known in the art.

Figure 8A:
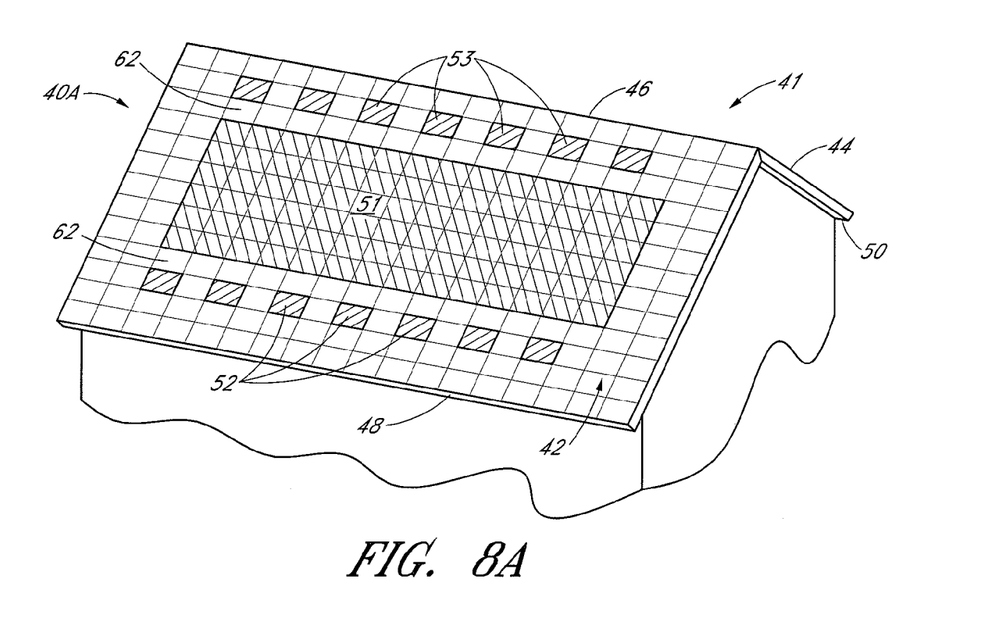
FIG. 8A is a perspective view of a building having a roof with solar panels and field vents, illustrating an arrangement of the field vents in accordance with one embodiment of the present invention.
Figure 8B:
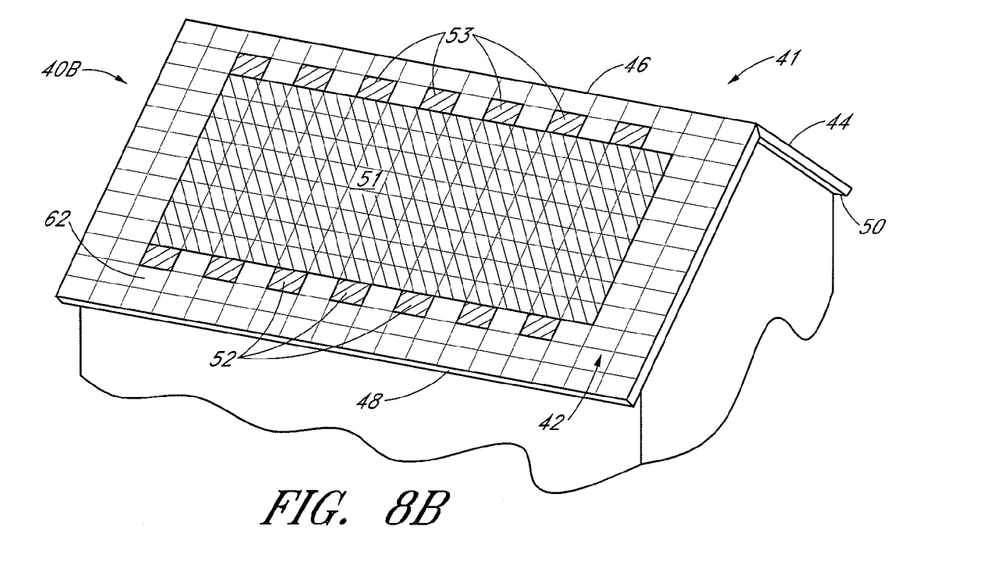
FIG. 8B is a perspective view of a building having a roof with solar panels and field vents, illustrating an arrangement of the field vents in accordance with another embodiment of the present invention.

With reference to FIGS. 4, 5A, and 7A, in a preferred embodiment, the cover elements 62 are provided in rows extending substantially parallel to the ridge 46. Referring to FIG. 8A, in a preferred embodiment, a building 40A includes a roof 41 that includes a single row of cover elements 62 interposed between the first plurality of field vents 52 and the solar panel field 51. Similarly, a single row of cover elements 62 is preferably interposed between the second plurality of field vents 53 and the solar panel field 51. This configuration permits the use of standard, commercially available roof field vents (e.g., from O'Hagins, Inc., of Sebastopol, Calif.) for the field vents 52, 53. For example, standard field vents designed to mimic the appearance of tiles typically have structures (e.g., storm clips) at their upslope and downslope edges for engaging upper and lower tiles. These commercially available vents are typically not configured to be engaged with a solar panel field 51. In another embodiment, a building 40B includes a roof 41, in which the field vents 52, 53 are immediately adjacent to the solar panel field 51, as shown, for example, in FIG. 8B. This configuration may require field vents 53 that are customized to engage the particular solar panel field 51 in use. Some ventilation product companies (e.g., O'Hagins, Inc.) are able to so customize roof field vents. This configuration is more preferred, because it provides improved ventilation of the solar panel field 51, with resultant improved solar panel efficiency. In the embodiment shown in FIG. 8B, at least one (and preferably all) of the field vents 52, 53 may be integrated with (e.g., rigidly affixed to) the solar panel field 51 prior to installing the field 51 onto the roof, for the ease of handling and installation. It will also be understood that the field vents 52, 53 can alternatively be spaced from the solar panel field 51 by two or more rows of cover elements 62. In selecting a position of the field vents 52 and 53, the closer such field vents are to the solar panel field 51, the better the ventilation of the solar panel field portion of the roof 41.

With continued reference to FIGS. 5A and 7A, in some embodiments the cover elements 62 do not engage one another in an airtight manner. In these embodiments, the cover elements 62 engage one another in a manner that produces passages between adjacent cover elements 62. Preferably, such passages permit small amounts of airflow to pass between the gap region 65, 68 and the atmosphere 74 above the roof. In this manner, the entire covering structure 58 can provide small ventilation pathways in addition to the field vents 52, 53. One example of a tile roof configuration providing for airflow between the batten cavity and the airspace above the roof, wherein such airflow passes between the tile intersections, is shown and described in U.S. Pat. No. 6,491,579, entitled "Roof Ventilation System and Method," the entire disclosure of which is hereby incorporated herein by reference.

Figure 5B:
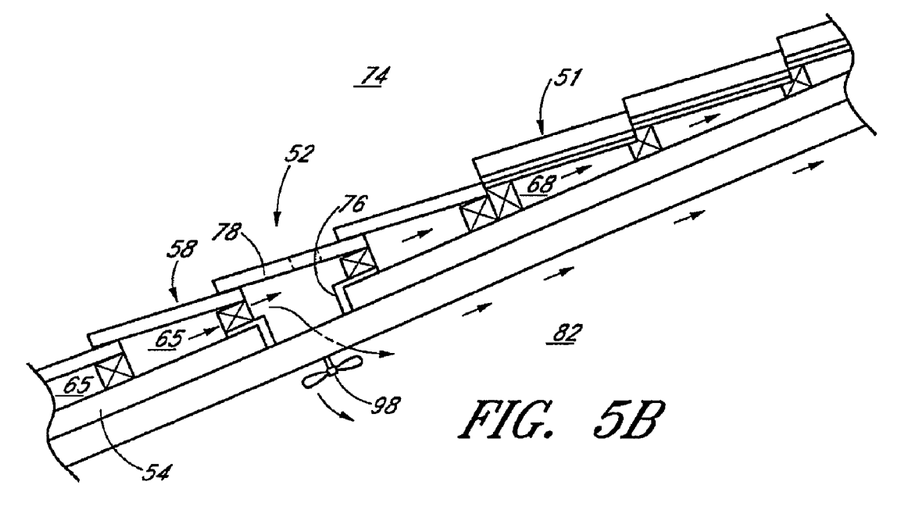
FIG. 5B is the same view of FIG. 5A, shown with arrows indicating airflow according to a preferred embodiment of the present invention.
Figure 7B:
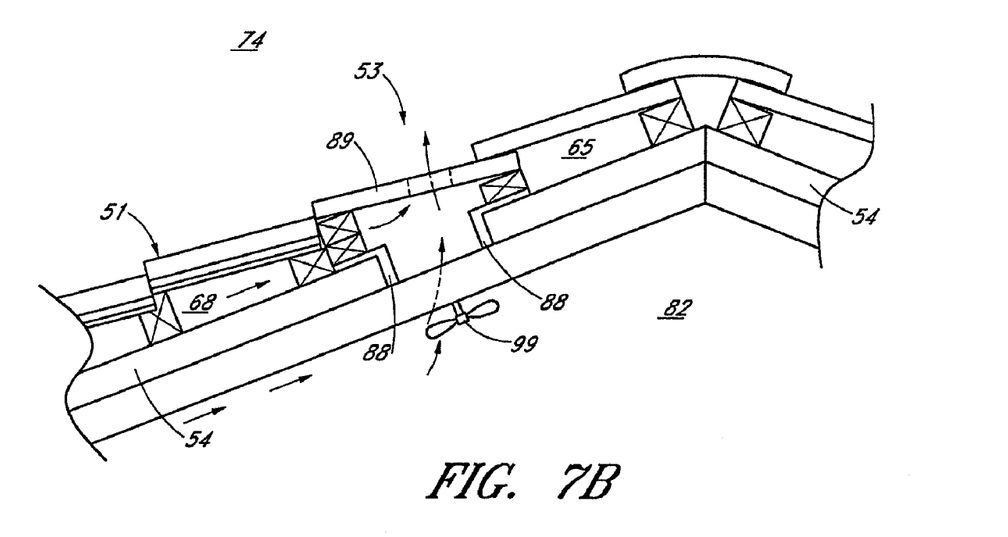
FIG. 7B is the same view of FIG. 7A, shown with arrows indicating airflow according to a preferred embodiment of the present invention.

FIGS. 5B and 7B illustrate an alternative embodiment, wherein the roof 41 (FIG. 4) includes a first plurality of fans 98 associated with the field vents 52 below the solar panel field 51, and/or a second plurality of fans 99 associated with the field vents 53 above the solar panel field. Each fan 98 is preferably positioned to generate airflow through an associated field vent 52. Each fan 98 is preferably configured to draw air from the atmosphere 74 above the roof 41 into the region 82 below the roof deck 54 through one of the vents 52. Similarly, each fan 99 is preferably positioned to generate airflow through an associated field vent 53. Each fan 99 is preferably configured to draw air from the region 82 below the roof deck 54 into the region 74 above the roof deck 54 through one of the vents 53. The fans 98, 99 are also preferably configured to draw air into and from the gap regions 65 and 68. The fans 98 and 99 can be powered with energy collected from the solar panel field 51, either directly or with the use of an intermediate battery. Alternatively, the fans can be powered by a different power supply. While each fan 98 is illustrated as being positioned below its associated primary vent member 76, the fan 98 could alternatively be positioned between the primary vent member 76 and the secondary vent member 78, and it could be integrated with either or both of the vent members 76, 78. Similarly, while each fan 99 is illustrated as being positioned below its associated primary vent member 88, the fan 99 could alternatively be positioned between the primary vent member 88 and the secondary vent member 89, and it could be integrated with either or both of the vent members 88, 89. Fans can also be provided in a similar manner with the embodiments shown in FIGS. 9 and 10, described below.

Figure 9:
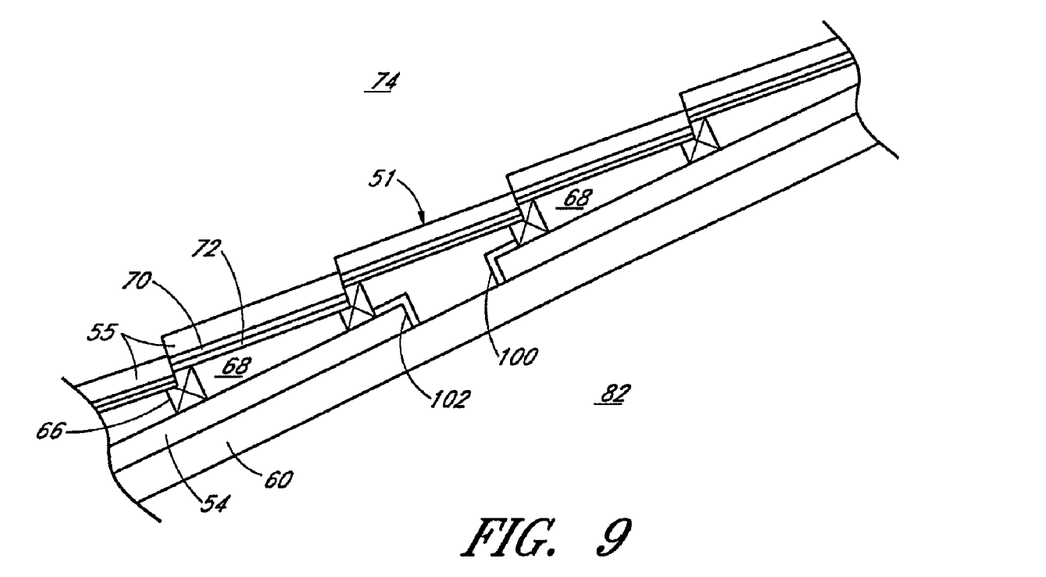
FIG. 9 is a cross-sectional view of a roof portion in accordance with another embodiment of the present invention.

FIG. 9 shows an embodiment in which the roof 41 further comprises at least one vent member 100 secured at an opening 102 in the roof deck 54 underneath the solar panel field 51. Preferably, the vent member 100 permits airflow through the opening 102 between the gap 68 and the region 82 below the roof deck 54. In one embodiment, the one or more vent members 100 are substantially similar to the primary vent members 76, 88 described above.

Figure 10:
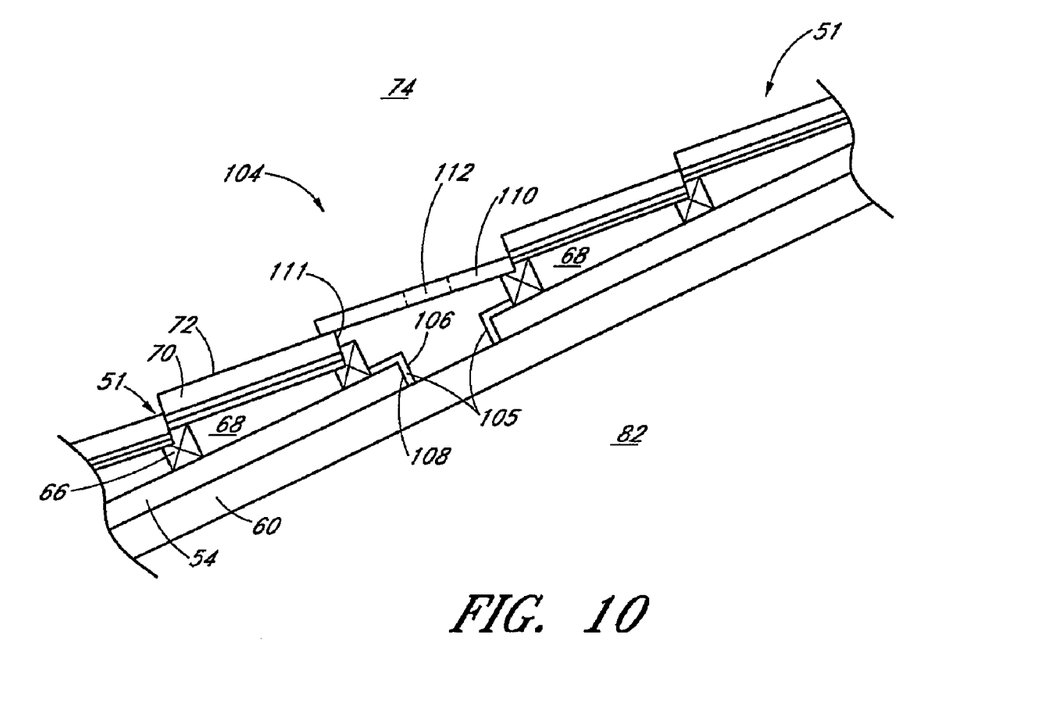
FIG. 10 is a cross-sectional view of a roof portion in accordance with another embodiment of the present invention.

FIG. 10 shows an embodiment in which one or more field vents 104 are provided within the solar panel field 51, the one or more field vents 104 permitting airflow between the gap 68 and the atmosphere 74 above the roof 41, as well as between the gap 68 and the region 82. It will be understood that, in this embodiment, there are preferably a plurality of solar panels. However, a single larger solar panel can be provided with one or more cutout areas for the insertion of the field vents 104. In one embodiment, each field vent 104 comprises a primary vent member 105 and a secondary vent member 110. The illustrated primary vent member 105 is provided within an opening 108 of the roof deck 54, and is preferably similar to the primary vent members 76, 88, and 100 described above. The illustrated primary vent member 105 has at least one opening 106 in fluid communication with the opening 108 and the gap 68. The illustrated secondary vent member 110 is provided within an opening 111 of the solar panel field 51. The secondary vent member 110 includes one or more openings 112 (illustrated schematically as dotted lines), such as louvers or the like. Preferably, the openings 112 and 106 are sized, positioned, and configured to prevent the ingress of water directly through the openings 112, 106, and 108 into the region 82. The secondary vent member 110 can be configured to mimic the appearance of the solar panel field 51. The secondary vent member 110 can be secured to the solar panel field 51 by any suitable method, such as a flange resting on and secured to the top surface of the field 51. Suitable seals can be provided to prevent water from seeping through the interfaces between the various illustrated components.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A roof portion comprising:
   a sloped roof deck;
   a cover layer spaced above the roof deck to form a gap between the roof deck and the cover layer, the cover layer comprising:
      a layer of cover elements; and
      a field of one or more solar panels generally within the layer of cover elements;
   a first plurality of field vents positioned within the cover layer substantially immediately downslope of the solar panel field;
   a second plurality of field vents positioned within the cover layer substantially immediately upslope of the solar panel field; and
   a plurality of fans, each fan being positioned to draw air from a region below the roof deck to the atmosphere above the roof through one of the vents of the second plurality of field vents;
   wherein the field vents permit airflow between the gap and the atmosphere above the roof,
   wherein the first and second pluralities of field vents are configured to generate a first airflow through the gap and underneath the solar panel field and over the roof deck, the first airflow extending from one to the other of the first and second pluralities of field vents, and
   wherein the first and second pluralities of field vents are configured to generate a second airflow through the region below the roof deck, the second airflow extending from one to the other of the first and second pluralities of field vents.

2. The roof portion of claim 1, wherein at least some of the field vents comprise:
   a primary vent member secured to the roof deck at an opening in the roof deck, the primary vent member permitting airflow through the opening between the gap and the region below the roof deck; and
   a secondary vent member positioned above the primary vent member within the cover layer, the secondary vent member permitting airflow between the gap and the atmosphere above the roof.

3. The roof portion of claim 2, wherein the secondary vent member mimics an appearance of the cover elements.

4. The roof portion of claim 2, wherein the primary and secondary vent members prevent ingress, from above the roof, of water, vermin, and debris through the primary vent member into the region below the roof deck, while facilitating airflow between the atmosphere above the roof and the region below the roof deck through the primary and secondary vent members.

5. The roof portion of claim 1, wherein the cover elements engage one another in a manner that produces passages between adjacent cover elements, the passages permitting airflow between the gap and the atmosphere above the roof.

6. The roof portion of claim 1, wherein the field vents mimic an appearance of the cover elements.

7. The roof portion of claim 6, wherein the cover elements comprise tiles.

8. The roof portion of claim 6, wherein the cover elements comprise shingles.

9. The roof portion of claim 1, further comprising a radiant barrier layer below the solar panel field and above the roof deck.

10. The roof portion of claim 9, wherein the solar panel field comprises a plurality of solar panels, the radiant barrier layer comprising a plurality of radiant barrier layer portions each underneath one of the solar panels.

11. The roof portion of claim 9, wherein the radiant barrier layer has a bottom surface that reflects radiant heat and a top surface that is substantially less reflective of radiant heat than the bottom surface.

12. The roof portion of claim 9, wherein the radiant barrier layer is spaced below the solar panel field and spaced above the roof deck.

13. The roof portion of claim 9, wherein the radiant barrier layer comprises aluminum foil.

14. The roof portion of claim 12, further comprising a spacer layer interposed between the solar panel field and the radiant barrier layer, the spacer layer including one or more air pockets.

15. The roof portion of claim 14, wherein the solar panel field comprises a plurality of solar panels, the spacer layer comprising a plurality of spacer layer portions each underneath one of the solar panels, the radiant barrier layer comprising a plurality of radiant barrier layer portions each underneath one of the spacer layer portions.

16. The roof portion of claim 14, wherein the spacer layer comprises bubble wrap.

17. The roof portion of claim 1, wherein the cover elements are provided in rows, a single row of cover elements being interposed between the first plurality of field vents and the solar panel field, another single row of cover elements being interposed between the second plurality of field vents and the solar panel field.

18. The roof portion of claim 1, wherein the first and second pluralities of field vents are immediately adjacent to the solar panel field.

19. The roof portion of claim 1, further comprising one or more field vents within the solar panel field, the one or more field vents permitting airflow between the gap and the atmosphere above the roof.

20. The roof portion of claim 1, further comprising another plurality of fans, each fan of said another plurality of fans being positioned to draw air from the atmosphere above the roof into the region below the roof deck through one of the vents of the first plurality of field vents.

21. The roof portion of claim 1, further comprising at least one vent member secured at an opening in the roof deck underneath the solar panel field, the at least one vent member permitting airflow through the opening between the gap and the region below the roof deck.

22. The roof portion of claim 1, wherein the solar panel field includes a plurality of solar panels.

23. The roof portion of claim 22, wherein the solar panels substantially mimic the appearance of the cover elements.

24. The roof portion of claim 1, wherein the solar panel field includes only one solar panel.

25. A method comprising:
providing a cover layer spaced above a sloped roof deck to form a gap between the roof deck and the cover layer, the cover layer comprising:
a layer of cover elements; and
a field of one or more solar panels generally within the layer of cover elements;
positioning a first plurality of field vents within the cover layer substantially immediately downslope of the solar panel field;
positioning a second plurality of field vents within the cover layer substantially immediately upslope of the solar panel field; and
position a plurality of fans so that each fan is positioned to draw air from a region below the roof deck to the atmosphere above the roof through one of the vents of the second plurality of field vents;
wherein the field vents permit airflow between the gap and the atmosphere above the roof,
wherein the first and second pluralities of field vents are configured to generate a first airflow through the gap and underneath the solar panel field and over the roof deck, the first airflow extending from one to the other of the first and second pluralities of field vents, and
wherein the first and second pluralities of field vents are configured to generate a second airflow through the region below the roof deck, the second airflow extending from one to the other of the first and second pluralities of field vents.

26. The method of claim 25, wherein positioning the first and second pluralities of field vents comprises:
securing a primary vent member to the roof deck at an opening in the roof deck, the primary vent member permitting airflow through the opening between the gap and the region below the roof deck; and
positioning a secondary vent member above the primary vent member, the secondary vent member permitting airflow between the gap and the atmosphere above the roof.

27. The method of claim 26, wherein the secondary vent member mimics an appearance of the cover elements.

28. The method of claim 26, wherein the primary and secondary vent members prevent ingress, from above the roof, of water, vermin, and debris through the primary vent member into the region below the roof deck, while facilitating airflow between the atmosphere above the roof and the region below the roof deck through the primary and secondary vent members.

29. The method of claim 25, further comprising engaging the cover elements with one another in a manner that produces passages between adjacent cover elements, the passages permitting airflow between the gap and the atmosphere above the roof.

30. The method of claim 25, wherein the field vents mimic an appearance of the cover elements.

31. The method of claim 30, wherein the cover elements comprise tiles.

32. The method of claim 30, wherein the cover elements comprise shingles.

33. The method of claim 25, further comprising providing a radiant barrier layer below the solar panel field and above the roof deck.

34. The method of claim 33, wherein the solar panel field comprises a plurality of solar panels, and wherein providing the radiant barrier layer comprises providing a plurality of radiant barrier layer portions each underneath one of the solar panels.

35. The method of claim 33, wherein the radiant barrier layer has a bottom surface that reflects radiant heat and a top surface that is less reflective of radiant heat than the bottom surface.

36. The method of claim 33, further comprising positioning the radiant barrier layer so that it is spaced below the solar panel field and spaced above the roof deck.

37. The method of claim 33, wherein providing the radiant barrier layer comprises providing aluminum foil.

38. The method of claim 36, further comprising interposing a spacer layer between the solar panel field and the radiant barrier layer, the spacer layer including one or more air pockets.

39. The method of claim 38, wherein the solar panel field comprises a plurality of solar panels, wherein providing the spacer layer comprises providing a plurality of spacer layer portions each underneath one of the solar panels, wherein providing the radiant barrier layer comprises providing a plurality of radiant barrier layer portions each underneath one of the spacer layer portions.

40. The method of claim 38, wherein providing the spacer layer comprises providing bubble wrap.

41. The method of claim 25, wherein providing the cover layer comprises providing the cover elements in rows, the method further comprising:
positioning the first plurality of field vents so that a single row of cover elements is interposed between the first plurality of field vents and the solar panel field; and
positioning the second plurality of field vents so that another single row of cover elements is interposed between the second plurality of field vents and the solar panel field.

42. The method of claim 25, wherein positioning the first and second pluralities of field vents comprises positioning the first and second pluralities of field vents immediately adjacent to the solar panel field.

43. The method of claim 25, further comprising providing one or more field vents within the solar panel field, the one or more field vents permitting airflow between the gap and the atmosphere above the roof.

44. The method of claim 25, further comprising positioning another plurality of fans so that each fan of said plurality of fans is positioned to draw air from the atmosphere above the roof into the region below the roof deck through one of the vents of the first plurality of field vents.

45. The method of claim 25, further comprising securing at least one vent member at an opening in the roof deck underneath the solar panel field, the at least one vent member permitting airflow through the opening between the gap and the region below the roof deck.

46. The method of claim 25, wherein the solar panel field includes a plurality of solar panels.

47. The method of claim 46, wherein the solar panels substantially mimic the appearance of the cover elements.

48. The method of claim 25, wherein the solar panel field includes only one solar panel.

* * * * *

UNITED STATES PATENT AND TRADEMARK OFFICE
CERTIFICATE OF CORRECTION

| | |
|---|---|
| PATENT NO. | : 7,618,310 B2 |
| APPLICATION NO. | : 11/682226 |
| DATED | : November 17, 2009 |
| INVENTOR(S) | : Gregory S. Daniels |

Page 1 of 1

It is certified that error appears in the above-identified patent and that said Letters Patent is hereby corrected as shown below:

Col. 11, line 35, delete "position" and insert -- positioning, -- therefor.

Col. 12, line 64, after "said", insert -- another -- therefor.

Signed and Sealed this

Thirtieth Day of March, 2010

David J. Kappos
*Director of the United States Patent and Trademark Office*